United States Patent
Peng et al.

(10) Patent No.: US 10,102,852 B2
(45) Date of Patent: Oct. 16, 2018

(54) PERSONALIZED SPEECH SYNTHESIS FOR ACKNOWLEDGING VOICE ACTIONS

(71) Applicant: Google LLC, Mountain View, CA (US)

(72) Inventors: Fuchun Peng, Cupertino, CA (US); Jakob Nicolaus Foerster, Zurich (CH); Diego Melendo Casado, San Francisco, CA (US); Fei Huang, New York, NY (US); Francoise Beaufays, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/686,670

(22) Filed: Apr. 14, 2015

(65) Prior Publication Data
US 2016/0307569 A1    Oct. 20, 2016

(51) Int. Cl.
| | |
|---|---|
| *G10L 15/22* | (2006.01) |
| *G10L 15/26* | (2006.01) |
| *G10L 13/033* | (2013.01) |
| *G10L 15/07* | (2013.01) |
| *G10L 15/187* | (2013.01) |

(52) U.S. Cl.
CPC ............ *G10L 15/22* (2013.01); *G10L 13/033* (2013.01); *G10L 15/26* (2013.01); *G10L 15/07* (2013.01); *G10L 15/187* (2013.01); *G10L 2015/221* (2013.01); *G10L 2015/225* (2013.01)

(58) Field of Classification Search
CPC ... G10L 15/22; G10L 15/26; G10L 2015/225; G10L 15/07; G10L 15/187; G10L 13/033; G10L 2015/221
See application file for complete search history.

(56) References Cited

U.S. PATENT DOCUMENTS

| | | | | |
|---|---|---|---|---|
| 5,787,231 A | * | 7/1998 | Johnson ............... | G10L 13/033 704/260 |
| 5,850,629 A | * | 12/1998 | Holm ...................... | G06F 3/16 704/260 |

(Continued)

FOREIGN PATENT DOCUMENTS

CN            103236259          8/2013

OTHER PUBLICATIONS

International Search Report and Written Opinion in International Application No. PCT/US2016/025687, dated Jul. 7, 2016, 13 pages.

*Primary Examiner* — Walter Yehl
(74) *Attorney, Agent, or Firm* — Fish & Richardson P.C.

(57) ABSTRACT

Methods, systems, and apparatus, including computer programs encoded on a computer storage medium, for presenting notifications in an enterprise system. In one aspect, a method include actions of obtaining a template that defines (i) trigger criteria for presenting a notification type and (ii) content rules for determining content to include in a notification of the notification type. Additional actions include accessing enterprise resources of an enterprise, the enterprise resources including data describing entities related to the enterprise and relationships among the entities. Further actions include, accessing user information specific to a user and determining that the trigger criteria is satisfied by the enterprise resources and the user information. Additional actions include generating a particular notification of the notification type based at least on the content rules and providing the particular notification to the user.

20 Claims, 4 Drawing Sheets

(56) References Cited

U.S. PATENT DOCUMENTS

| | | | | |
|---|---|---|---|---|
| 6,016,471 | A * | 1/2000 | Kuhn | G10L 13/08 |
| | | | | 704/266 |
| 6,078,885 | A * | 6/2000 | Beutnagel | G10L 15/063 |
| | | | | 704/231 |
| 6,711,543 | B2 | 3/2004 | Cameron | |
| 7,899,669 | B2 * | 3/2011 | Gadbois | G10L 15/32 |
| | | | | 379/88.01 |
| 8,041,569 | B2 | 10/2011 | Okutani et al. | |
| 8,417,530 | B1 | 4/2013 | Hayes | |
| 8,719,027 | B2 * | 5/2014 | Chen | G10L 13/08 |
| | | | | 704/257 |
| 8,886,538 | B2 | 11/2014 | Aaron et al. | |
| 9,111,457 | B2 * | 8/2015 | Beckley | G09B 5/04 |
| 2006/0190260 | A1 * | 8/2006 | Iso-Sipila | G10L 15/22 |
| | | | | 704/258 |
| 2006/0229870 | A1 | 10/2006 | Kobal et al. | |
| 2007/0233493 | A1 * | 10/2007 | Nakao | G10L 13/08 |
| | | | | 704/260 |
| 2007/0239455 | A1 | 10/2007 | Groble et al. | |
| 2008/0077386 | A1 * | 3/2008 | Gao | G06F 17/28 |
| | | | | 704/3 |
| 2008/0208574 | A1 | 8/2008 | Chen et al. | |
| 2009/0055380 | A1 * | 2/2009 | Peng | G06F 17/30646 |
| 2009/0192798 | A1 * | 7/2009 | Basson | G06F 17/289 |
| | | | | 704/270 |
| 2009/0258333 | A1 * | 10/2009 | Yu | G09B 5/04 |
| | | | | 434/157 |
| 2010/0049518 | A1 * | 2/2010 | Ferrieux | G10L 19/0018 |
| | | | | 704/254 |
| 2012/0029904 | A1 * | 2/2012 | Precoda | G10L 15/06 |
| | | | | 704/2 |
| 2013/0090921 | A1 * | 4/2013 | Liu | G10L 15/22 |
| | | | | 704/10 |
| 2014/0074470 | A1 * | 3/2014 | Jansche | G10L 15/187 |
| | | | | 704/244 |
| 2014/0272821 | A1 * | 9/2014 | Pitschel | G09B 19/06 |
| | | | | 434/157 |
| 2014/0278400 | A1 | 9/2014 | Coussemaeker et al. | |
| 2014/0365216 | A1 * | 12/2014 | Gruber | G10L 13/027 |
| | | | | 704/235 |
| 2015/0170642 | A1 * | 6/2015 | Peng | G10L 15/187 |
| | | | | 704/235 |
| 2015/0243278 | A1 * | 8/2015 | Kibre | G10L 15/075 |
| | | | | 704/243 |
| 2017/0084267 | A1 * | 3/2017 | Shin | G10L 15/063 |

* cited by examiner

PERSONALIZED SPEECH SYNTHESIS FOR ACKNOWLEDGING VOICE ACTIONS

TECHNICAL FIELD

This disclosure generally relates to speech synthesis.

BACKGROUND

A system that is responsive to voice queries may provide an acknowledgment of a voice query. For example, a user may say "Call Dave" and the system may provide a speech acknowledgment, "Calling Dave," and then initiate a call to a contact of the user's, named "Dave."

SUMMARY

In general, an aspect of the subject matter described in this specification may involve a process for personalized pronunciations. A system that provides personalized pronunciations may provide spoken acknowledgments that are consistent with how a user pronounces a word. For example, regardless of how a user pronounces a name in a voice query, the system may provide a spoken acknowledgment for the voice query with the same pronunciation for that name. In response to a voice query from a user, the system may learn the user's pronunciation automatically without enrollment by the user, and the system may generate and use the learned pronunciation in a voice acknowledgment in response to the voice query from which the system learned the user's pronunciation.

In some aspects, the subject matter described in this specification may be embodied in methods that may include the actions of receiving audio data encoding a voice query and obtaining a transcription of the voice query from the audio data. The transcription may include a particular term. Further actions include determining, from the audio data, custom pronunciation data associated with the particular term and generating a spoken acknowledgment of the voice query. The spoken acknowledgment may include the particular term, and when output, the particular term may be spoken in accordance with the custom pronunciation data that was determined from the audio data. Additional actions may include providing the spoken acknowledgment for output and providing the voice query for execution.

Other versions include corresponding systems, apparatus, and computer programs, configured to perform the actions of the methods, encoded on computer storage devices.

These and other versions may each optionally include one or more of the following features. For instance, in some implementations determining, from the audio data, custom pronunciation data associated with the particular term includes identifying a portion of the audio corresponding to the particular term and determining a sequence of phones from the portion of the audio corresponding to the particular term.

In certain aspects, determining, from the audio data, custom pronunciation data associated with the particular term includes obtaining custom pronunciation data from the audio data before obtaining the transcription of the voice query from the audio data and mapping the custom pronunciation data from the audio data corresponding to the particular term to the particular term in the transcription.

In some aspects, additional actions include determining that the transcription includes a proper name. Providing the spoken acknowledgment of the voice query for output may be in response to determining that the transcription includes a proper name.

In some implementations, determining that the transcription includes a proper name includes determining that the transcription includes one or more terms that indicate that the transcription includes a proper name.

In certain aspects, additional actions include determining, from the audio data, a confidence score for the custom pronunciation data associated with the particular term and determining that the confidence score for the custom pronunciation data satisfies a confidence threshold, where providing the spoken acknowledgment of the voice query for output is in response to determining that the confidence score for the custom pronunciation data satisfies the confidence threshold.

In some aspects, obtaining a transcription of the voice query from the audio data, wherein the transcription includes a particular term, includes obtaining the transcription of the voice query from the audio data based at least on canonical pronunciation data associated with the particular term, where the canonical pronunciation data is stored in a pronunciation dictionary and different from the custom pronunciation data.

The details of one or more implementations of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
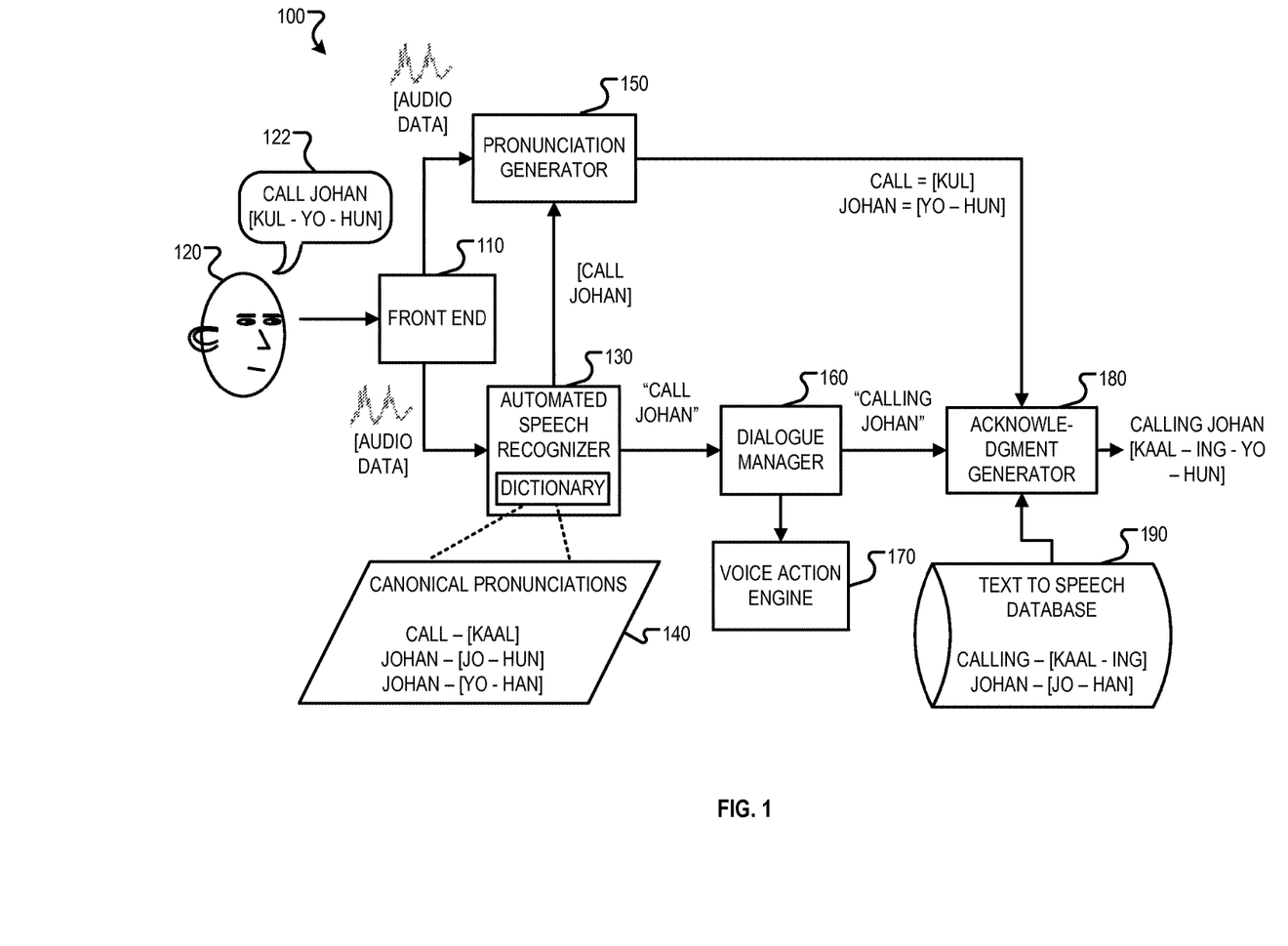
FIG. 1 is an illustration of a block diagram of an example system for providing personalized pronunciations.

FIG. 1 is a block diagram of an example system 100 for providing personalized pronunciations. Briefly, and as described in further detail below, the system 100 may include a front end 110, an automated speech recognizer (ASR) 130, a pronunciation generator 150, a dialogue manager 160, a voice action engine 170, an acknowledgment generator 180, and a text to speech database (TTS) 190.

The front end 110 may be a component of the system 100 that obtains audio data encoding a voice query. A voice query may be an utterance of a user 120 that causes the system to perform an action, e.g., initiating a phone call, performing a search query, or sending an e-mail. An action performed in response to a voice query may be referred to as a voice action. The audio data encoding the voice query may include a representation of mel-frequency cepstral coefficients corresponding to the voice query.

The front end 110 may obtain audio data by generating the audio data. For example, the front end 110 may include a microphone that senses acoustic waveforms corresponding to a voice query, "Call Johan" pronounced as "Kul-Yo-Hun" and generates audio data that represents the sensed acoustic waveforms. Additionally or alternatively, the front end 110 may obtain audio data from another source. For example, the front end 110 may be part of a server that receives the audio data from a client that generates the audio data.

The front end 110 may provide the audio data at least partially in parallel to both the ASR 130 and the pronunciation generator 150. For example, the front end 110 may provide the mel-frequency cepstral coefficients for the voice query to both the ASR 130 and the pronunciation generator 150, substantially simultaneously.

The ASR 130 may automatically recognize speech and generate a transcription of the speech. For example, the ASR 130 may receive the audio data representing the voice query "Call Johan" and transcribe the voice query as the text "Call Johan." The ASR 130 may recognize speech using known pronunciations for different words or sub-words. For example, the ASR 130 may obtain known pronunciation data that indicates that the word "Call" is pronounced as "Kaal," recognize audio data corresponding to "Call" pronounced as "Kul" as sufficiently similar to "Kaal," and in response transcribe the audio data corresponding to "Call" as "Call."

The ASR 130 may obtain the known pronunciations from a dictionary 140. The dictionary 140 may store canonical pronunciations of various terms. For example, the dictionary 140 may store that the canonical pronunciation for "Call" is "Kaal" and that canonical pronunciations for "Johan" are "Jo-Hun" and "Yo-Han." Canonical pronunciations may be one or more of pronunciations that are generated based on pronunciation rules or pronunciations that are generic and independent of any particular speaker.

The ASR 130 may provide the transcription of the voice query to the pronunciation generator 150 and the dialogue manager 160. For example, the ASR 130 may provide the transcription "Call Johan" to both the pronunciation generator 150 and the dialogue manager 160.

The pronunciation generator 150 may generate custom pronunciation data for terms. For example, the pronunciation generator 150 may receive audio data for a voice query from the front end 110 and a transcription from the ASR 130, and generate custom pronunciation data for pronouncing one or more terms in the transcription in accordance with how the one or more terms were pronounced for the voice query.

The custom pronunciation data for a particular term may be data that indicates how the particular term should be pronounced. For example, the custom pronunciation data may indicate the phones used to pronounce a particular term, as well as stresses for pronouncing the particular term. The custom pronunciation data for a particular term may be different from canonical pronunciation data for the particular term when the user pronounces a word differently than how the canonical pronunciation data indicates the particular term is pronounced. For example, the custom pronunciation data for "Johan" may indicate that a user pronounced "Johan" as "Yo-Hun" while the canonical pronunciation data for "Johan" may indicate that it is generally pronounced as "Jo-Hun."

The pronunciation generator 150 may begin the process of generating the custom pronunciation data for a particular term after receiving the audio data from the front end 110 and before receiving the transcription from the ASR 130. For example, the pronunciation generator 150 may receive the audio data for "Call Johan" pronounced as "Kul-Yo-Hun" and begin the process for generating custom pronunciation data for the terms "Call Johan" before receiving the transcription "Call Johan" from the ASR 130.

In generating the custom pronunciation data, the pronunciation generator 150 may process the audio data to determine the phones that were pronounced and how the phones were pronounced, then receive the transcription from the ASR 130, align the terms in the transcription with the phones determined to be pronounced, and generate custom pronunciation data for each term in the transcription based on the phones used to pronounce the term and how the phones were pronounced. For example, the pronunciation generator 150 may receive audio data for "Call Johan" pronounced as "Kul-Yo-Hun," determine from the audio data that the phones "Kul," "Yo," and "Hun," were pronounced and that "Yo" was spoken louder than "Hun," receive the transcription "Call Johan," align the term "Call" with the phone "Kul" and align the term "Johan" with the phones "Yo" and "Hun," and generate custom pronunciation data indicating that "Call" was pronounced as "Kul," that "Johan" was pronounced as "Yo-Hun," and "Yo" was pronounced louder than "Hun."

The pronunciation generator 150 may provide the custom pronunciation data to the acknowledgment generator 180. For example, the pronunciation generator 150 may provide custom pronunciation data indicating that "Call" was pronounced as "Kul" and that "Johan" was pronounced as "Yo-Hun" to the acknowledgment generator 180.

The dialogue manager 160 may also receive the transcription from the ASR 130 and trigger the generation of a spoken acknowledgment. For example, the dialogue manager 160 may receive the transcription "Call Johan" and trigger the generation of a spoken acknowledgment of "Calling Johan."

The dialogue manager 160 may determine to trigger generation of a spoken acknowledgment based on determining that the transcription includes a trigger term for an action for which to provide a spoken acknowledgment. For example, the dialogue manager 160 may determine that a spoken acknowledgment of "Calling Johan" should be generated based on determining that the transcription includes the trigger term "Call" for an action of calling for which a spoken acknowledgment of "Calling [Name]" is provided, where "[Name]" represents the term that follows "Call" in the voice query. A trigger term may be a term whose presence triggers an action. For example, "Call" may be a trigger term that triggers an action of calling and "Text message" may be a trigger term that triggers an action of text messaging.

In response to determining that a spoken acknowledgment should be generated, the dialogue manager 160 may generate the text for the spoken acknowledgment and provide the text to the acknowledgment generator 180. For example, in response to determining that a spoken acknowledgment of "Calling Johan" should be provided in response to the voice query "Call Johan," the dialogue manager 160 may provide the text "Calling Johan" to the acknowledgment generator 180.

The dialogue manager 160 may provide an instruction to a voice action engine 170 to execute a voice action. For example, the dialogue manager 160 may determine that the transcription includes a trigger term "Call" and in response, provide an instruction to the voice action engine 170 to execute a "Call" action that includes parameters used to execute the call, e.g., a phone number or identification of a particular contact record. The voice action engine 170 may be an engine that executes actions in response to voice queries. For example, the voice action engine 170 may receive an instruction from the dialogue manager 160 to execute a "Call" action where the action is to call the number associated with a contact for "Johan," and execute the action.

The acknowledgment generator 180 may generate a spoken acknowledgment of the voice query in accordance with custom pronunciation data. For example, the acknowledgment generator 180 may receive the custom pronunciation data for "Call" and "Johan" from the pronunciation generator 150 and the text "Calling Johan" for the spoken acknowledgment from the dialogue manager 160, and generate a spoken acknowledgment by synthesizing speech for "Calling Johan" where both "Calling" is pronounced as "Kaal-ing" according to canonical pronunciation data from the TTS database 190 and "Johan" is pronounced as "Yo-hun" according to the custom pronunciation data.

The acknowledgment generator 180 may generate the spoken acknowledgment based on determining whether any terms in the text for the speech acknowledgment correspond with terms for which the acknowledgment generator 180 has received custom pronunciation data. For example, the acknowledgment generator 180 may determine that the text of "Calling Johan" for the speech acknowledgment includes the terms "Calling" and the terms "Johan," and determine that the custom pronunciation data includes a custom pronunciation for the term "Johan." In response to the determinations, the acknowledgment generator 180 may generate a speech acknowledgment of "Calling Johan" using the custom pronunciation for the term "Johan."

In some implementations the acknowledgment generator 180 may generate a speech acknowledgment using the custom pronunciation data for any term in the text for the speech acknowledgment that is indicated as having a custom pronunciation. For example, the acknowledgment generator 180 may also determine that the custom pronunciation data for "Call" pronounced as "Kul" corresponds to "Calling" and determine to pronounce "Calling" as "Kul-ing."

In other implementations, the acknowledgment generator 180 may use custom pronunciation data for proper names and not use custom pronunciation data for non-proper names. For example, the acknowledgment generator 180 may generate a speech acknowledgment using custom pronunciation data for the term "Johan" that is a proper name and not use the custom pronunciation data for the term "Calling" that is not a proper name.

In generating a speech acknowledgment using custom pronunciation data for proper names and not using custom pronunciation data for non-proper names, the acknowledgment generator 180 may first identify proper names in the text of the spoken acknowledgment and then determine whether any custom pronunciation data corresponds to the proper names in the text. For example, the acknowledgment generator 180 may identify that "Johan" is a proper name in the text of the spoken acknowledgment and then determine whether the custom pronunciation data indicates a custom pronunciation for the term "Johan." Alternatively, the acknowledgment generator 180 may determine terms in the text that have matching candidate pronunciations, and then determine whether the terms with matches are proper names. For example, the acknowledgment generator 180 may determine that the term "Johan" is in the text for the speech acknowledgment and the custom pronunciation data indicates that the term "Johan" has a custom pronunciation, and then determine whether the term "Johan" is a proper name.

The acknowledgment generator 180 may identify proper names based on grammar rules or voice query rules that specify that particular terms are followed or preceded by proper names, or particular terms are proper names. For example, rules may specify that "Call" is followed by a proper name. In another example, the rules may specify that for particular terms, e . . . , "Johan," "Dave," or other names, these particular terms are proper names independent of the context in which the term appears.

The acknowledgment generator 180 may receive canonical pronunciations from the TTS database 190. For example, the TTS database 190 may store data indicating that "Calling" is canonically pronounced as "Kaal-ing" and that "Johan" is canonically pronounced as "Jo-Han." The TTS database 190 may be similar to the dictionary 140 in associating particular terms with particular canonical pronunciations. In some implementations, the TTS database 190 may only include a single canonical pronunciation for a term while the dictionary 140 may include multiple canonical pronunciations for a term.

In some implementations, acknowledgment generator 180 may also generate the speech acknowledgment based on confidence scores indicated by the custom pronunciation data. Confidence scores indicated by the custom pronunciation data may indicate a confidence that the custom pronunciation for a term is accurate. For example, a low confidence score for the custom pronunciation for a particular term may indicate that there is a low confidence that the custom pronunciation for the term is accurate and a high confidence score for the custom pronunciation for a particular term may indicate that there is a high confidence that the custom pronunciation for the term is accurate. The acknowledgment generator 180 may determine to use a custom pronunciation for a particular term if the custom pronunciation data indicates a confidence score that satisfies a confidence threshold. For example, the confidence threshold may be that the confidence score indicates a confidence above 80%, 70%, or some other percentage, that the custom pronunciation is accurate. The confidence scores may be generated by the pronunciation generator 150 and included in the custom pronunciation data.

Different configurations of the system 100 may be used where functionality of the front end 110, the automated speech recognizer (ASR) 130, the pronunciation generator 150, the dialogue manager 160, the voice action engine 170, the acknowledgment generator 180, and the text to speech database (TTS) 190 may be combined, further separated, distributed, or interchanged. The system 100 may be implemented in a single device or distributed across multiple devices.

Figure 2:
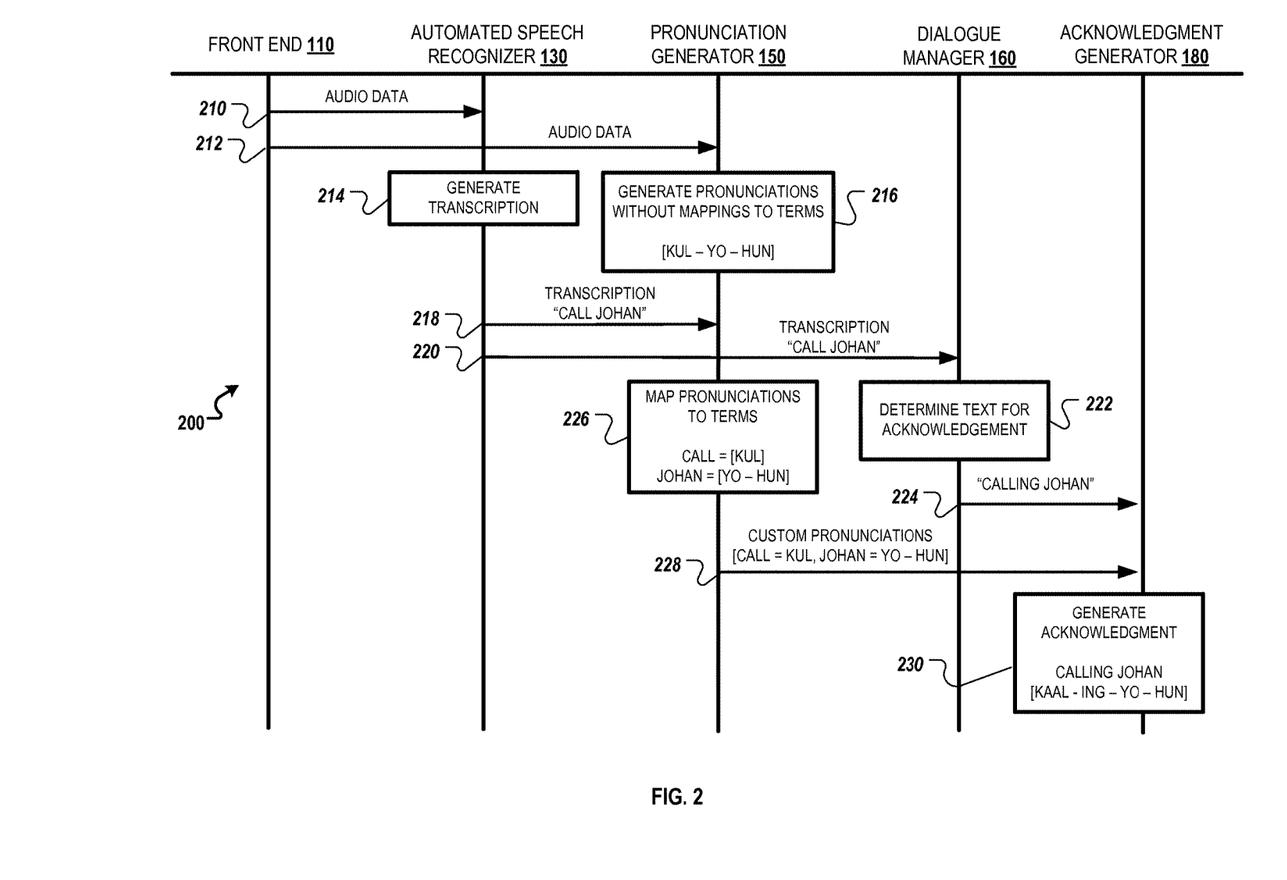
FIG. 2 is an interaction diagram of an example interaction of providing personalized pronunciations.

FIG. 2 is an interaction diagram 200 of providing personalized pronunciations. The following describes the interaction as being performed by components of the system 100 that are described with reference to FIG. 1. However, the interaction may be performed by other systems or system configurations.

Initially, the front end 110 may provide audio data encoding a voice query to the ASR 130 (210) and the pronunciation generator 150 (212). For example, the front end 110 may provide the audio data corresponding to "Call Johan" just spoken by a particular user as "Kul-Yo-Hun." The front end 110 may provide the audio data to the ASR 130 and the pronunciation generator 150 substantially in parallel.

The ASR 130 may generate a transcription of the audio data (214). For example, the ASR 130 may generate the transcription "Call Johan" from the audio data corresponding to the particular user saying "Call Johan."

The pronunciation generator 150 may generate pronunciations without mappings to terms based on the audio data (216). For example, the pronunciation generator 150 may determine the phones "Kul," "Yo," and "Hun" match the sounds encoded by the audio data.

The ASR 130 may provide the transcription of the audio data to the pronunciation generator 150 (218) and the dialogue manager 160 (220). For example, the ASR 130 may provide the transcription "Call Johan" to both the pronunciation generator 150 and the dialogue manager 160. The ASR 130 may provide the transcription to the pronunciation generator 150 and the dialogue manager 160 substantially in parallel.

The dialogue manager 160 may determine text for an acknowledgment to the voice query (222). For example, the dialogue manager 160 may determine that the transcription "Call Johan" corresponds to a voice action for which to provide the acknowledgment "Calling John."

The dialogue manager 160 may provide the text for the acknowledgment to the acknowledgment generator 180 (224). For example, the dialogue manager 160 may provide the text "Calling Johan" to the acknowledgment generator 180.

The pronunciation generator 150 may map the pronunciations to terms in the transcription (226). For example, the pronunciation generator 150 may map the term "Call" with the pronunciation "Kul" and map the term "Johan" with the pronunciation "Yo-hun."

The pronunciation generator 150 may provide custom pronunciation data indicating the custom pronunciations to the acknowledgment generator 180 (228). For example, the pronunciation generator 150 may provide custom pronunciation data, that indicate the term "Call" maps with the pronunciation "Kul" and the term "Johan" maps with the pronunciation "Yo-hun," to the acknowledgment generator 180.

The acknowledgment generator 180 may generate a spoken acknowledgment (230). For example, the acknowledgment generator 180 may generate a spoken acknowledgment of "Calling Johan" pronounced as "Kaal-ing-yo-hun" pronounced according to the custom pronunciation data for "Johan" and the canonical pronunciation data for "Calling."

Figure 3:
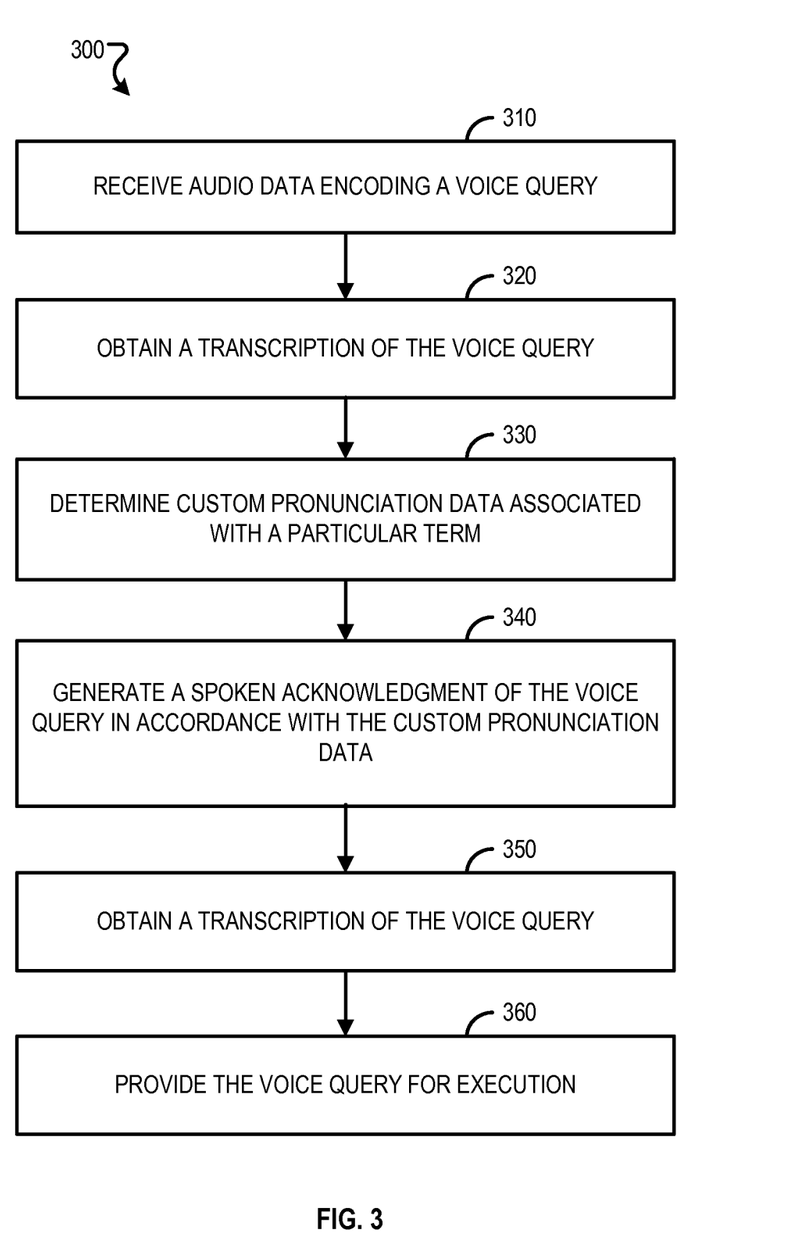
FIG. 3 is a flowchart of an example process for providing personalized pronunciations.

FIG. 3 is a flowchart of an example process 300 for providing personalized pronunciations. At 310, audio data encoding a voice query is received. At 320, a transcription of the voice query is obtained from the audio data, where the transcription includes a particular term. In some cases, obtaining a transcription of the voice query from the audio data includes obtaining the transcription of the voice query from the audio data based at least on canonical pronunciation data associated with the particular term, where the canonical pronunciation data is stored in a pronunciation dictionary and is different from the custom pronunciation data. At 330, custom pronunciation data associated with the particular term is determined from the audio data. In some cases, determining, from the audio data, custom pronunciation data associated with the particular term includes identifying a portion of the audio corresponding to the particular term and determining a sequence of phones from the portion of the audio corresponding to the particular term. In some cases, determining, from the audio data, custom pronunciation data associated with the particular term includes obtaining custom pronunciation data from the audio data before obtaining the transcription of the voice query from the audio data and mapping the custom pronunciation data from the audio data corresponding to the particular term to the particular term in the transcription. At 340, a spoken acknowledgment of the voice query is generated where the spoken acknowledgment includes the particular term, and where, when output, the particular term is spoken in accordance with the custom pronunciation data that was determined from the audio data. At 350, the spoken acknowledgment is provided for output. At 360, the voice query is provided for execution.

In some cases, the process 300 includes determining that the transcription includes a proper name, where providing the spoken acknowledgment of the voice query for output is in response to determining that the transcription includes a proper name. In some cases, determining that the transcription includes a proper name includes determining that the transcription includes one or more terms that indicate that the transcription includes a proper name. In some cases, the process 300 includes determining, from the audio data, a confidence score for the custom pronunciation data associated with the particular term and determining that the confidence score for the custom pronunciation data satisfies a confidence threshold, where providing the spoken acknowledgment of the voice query for output is in response to determining that the confidence score for the custom pronunciation data satisfies the confidence threshold.

Figure 4:
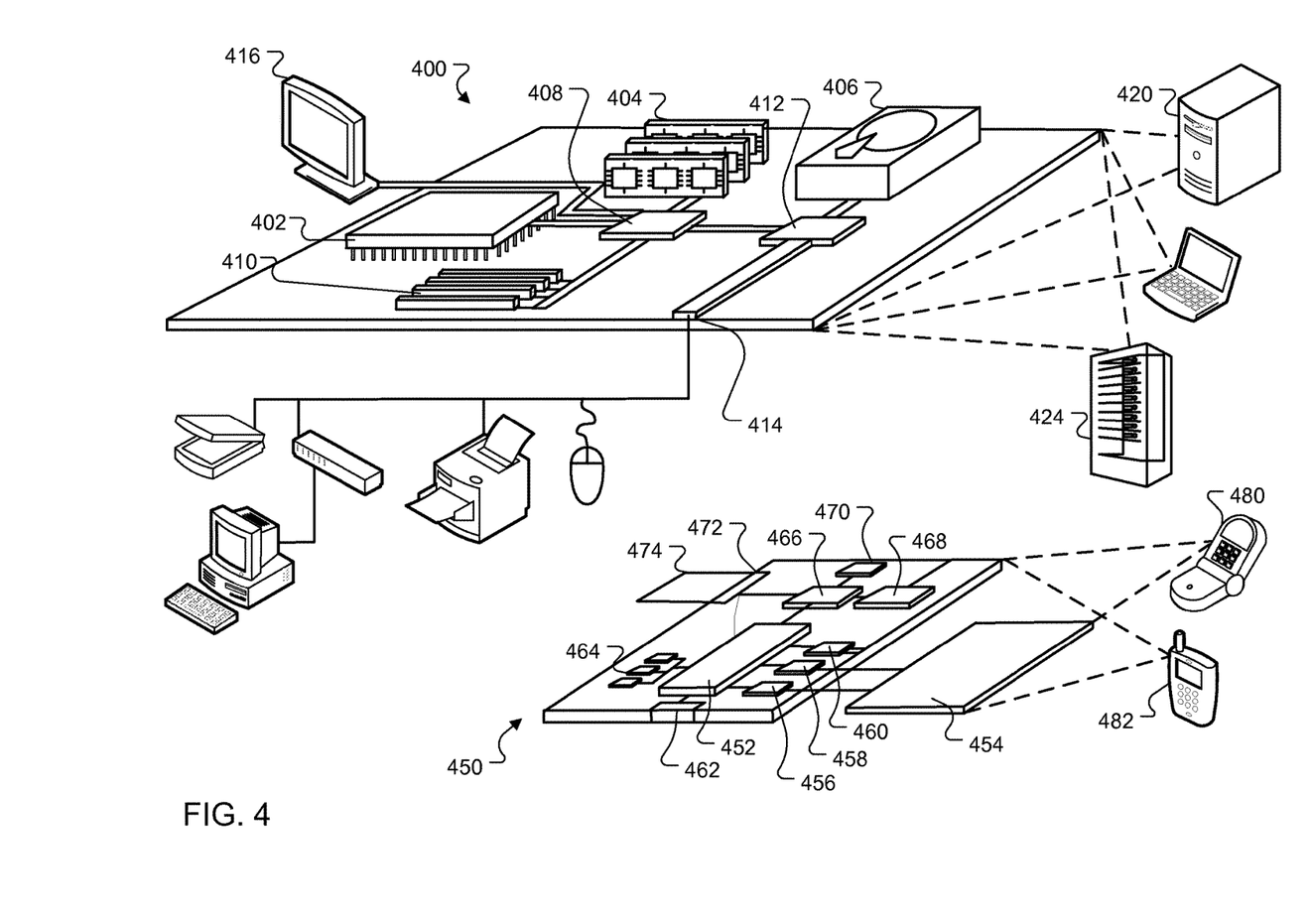
FIG. 4 is a diagram of exemplary computing devices.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile computing devices, such as personal digital assistants, cellular telephones, smart-phones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a graphical user interface (GUI) on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile computing device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452.

In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile computing device.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

What is claimed is:

1. A computer-implemented method for generating synthesized, spoken acknowledgments of voice queries using personalized pronunciations, the method comprising:
    receiving, by a front end component of a voice query processing system that includes (a) the front end component, (b) an automated speech recognizer that is configured to transcribe given audio inputs to terms, (c) a pronunciation generator that is separate from the automated speech recognizer and that is configured to generate sequences of phones that correspond to given audio inputs without mapping the sequences of phones to terms, (d) a text-to speech component, and (e) a voice action engine, audio data encoding a voice query from a user;
    providing, by the front end component of the voice query processing system, the audio data to both (i) the pronunciation generator that is separate from the automated speech recognizer and that is configured to generate, while the automated speech recognizer begins transcribing the audio data into terms, sequences of phones that correspond to given audio inputs without mapping the sequences of phone to terms, and (ii) the automated speech recognizer that is configured to transcribe given audio inputs to terms;
    obtaining, from the pronunciation generator that is separate from the automated speech recognizer and based on the pronunciation generator processing the audio data before the automated speech recognizer has completed transcribing the audio data, a sequence of phones that reflects the user's pronunciation of a particular term of the voice query;
    after obtaining the sequence of phones that reflects the user's pronunciation of the particular term of the voice query from the pronunciation generator, obtaining, from the automated speech recognizer, a transcription of the voice query from the audio data, wherein the transcription includes the particular term;
    after (i) obtaining the sequence of phones that reflects the user's pronunciation of the particular term of the voice query from the pronunciation generator and (ii) obtaining, from the automated speech recognizer, the transcription of the voice query from the audio data, determining that a spoken acknowledgment that is to be generated for the voice query should use the user's pronunciation for the particular term;
    generating, by the text-to-speech component of the voice query processing system, the spoken acknowledgment of the voice query, wherein, when output, the particular term is spoken in accordance with the user's pronunciation for the particular term based at least on the sequence of phones that was generated from the audio data by the pronunciation generator;
    providing, by the text-to-speech component of the voice query processing system, the spoken acknowledgment for output; and
    after providing the spoken acknowledgement for output, providing the voice query for execution by the voice action engine.

2. The method of claim 1, wherein obtaining, from the pronunciation generator that is separate from the automated speech recognizer and based on the pronunciation generator processing the audio data before the automated speech recognizer has completed transcribing the audio data, the sequence of phones that reflects the user's pronunciation of a particular term of the voice query comprises:
    identifying a portion of the audio corresponding to the particular term; and
    determining the sequence of phones from the portion of the audio corresponding to the particular term.

3. The method of claim 1, wherein obtaining, from the pronunciation generator that is separate from the automated speech recognizer and based on the pronunciation generator processing the audio data before the automated speech recognizer has completed transcribing the audio data, the sequence of phones that reflects the user's pronunciation of a particular term of the voice query comprises:
    mapping the sequence of phones from the audio data corresponding to the particular term to the particular term in the transcription.

4. The method of claim 1, comprising:
    determining that the transcription includes a proper name, wherein providing the spoken acknowledgment of the voice query for output is in response to determining that the transcription includes a proper name.

5. The method of claim 4, wherein determining that the transcription includes a proper name comprises:

determining that the transcription includes one or more terms that indicate that the transcription includes a proper name.

6. The method of claim 1, comprising:
determining, from the audio data, a confidence score for the sequence of phones that reflects a user's pronunciation for the particular term; and
determining that the confidence score for the sequence of phones satisfies a confidence threshold,
wherein providing the spoken acknowledgment of the voice query for output is in response to determining that the confidence score for the sequence of phones satisfies the confidence threshold.

7. The method of claim 1, wherein obtaining, from the automated speech recognizer, a transcription of the voice query from the audio data comprises:
obtaining the transcription of the voice query from the audio data based at least on canonical pronunciation data associated with the particular term, where the canonical pronunciation data is stored in a pronunciation dictionary and different from the sequence of phones determined from the audio data encoding the voice query from the user.

8. The method of claim 1, wherein obtaining, from the pronunciation generator that is separate from the automated speech recognizer and based on the pronunciation generator processing the audio data before the automated speech recognizer has completed transcribing the audio data, a sequence of phones that reflects the user's pronunciation of a particular term of the voice query comprises:
obtaining pronunciations for phones within the voice query;
after obtaining the transcription of the voice query from the automated speech recognizer, aligning at least a portion of the obtained pronunciations for the phones within the voice query with the term in the transcription; and
generating custom pronunciation data that reflects the user's pronunciation for the particular term from the portion of the obtained pronunciations for the phones within the voice query aligned with the term in the transcription.

9. The method of claim 1, wherein generating, by the text-to-speech component of the voice query processing system, a spoken acknowledgment of the voice query comprises:
obtaining text that includes the particular term for the spoken acknowledgement; and
synthesizing the spoken acknowledgement from the text based at least on (i) the sequence of phones for the particular term and (ii) canonical pronunciation data for one or more other terms in the text for the spoken acknowledgement.

10. A system for generating synthesized, spoken acknowledgements of voice queries using personalized pronunciations, the system comprising:
one or more computers; and
one or more storage devices storing instructions that are operable, when executed by the one or more computers, to cause the one or more computers to perform operations comprising:
receiving, by a front end component of a voice query processing system that includes (a) the front end component, (b) an automated speech recognizer that is configured to transcribe given audio inputs to terms, (c) a pronunciation generator that is separate from the automated speech recognizer and that is configured to generate sequences of phones that correspond to given audio inputs without mapping the sequences of phones to terms, (d) a text-to speech component, and (e) a voice action engine, audio data encoding a voice query from a user;
providing, by the front end component of the voice query processing system, the audio data to both (i) the pronunciation generator that is separate from the automated speech recognizer and that is configured to generate, while the automated speech recognizer begins transcribing the audio data into terms, sequences of phones that correspond to given audio inputs without mapping the sequences of phone to terms, and (ii) the automated speech recognizer that is configured to transcribe given audio inputs to terms;
obtaining, from the pronunciation generator that is separate from the automated speech recognizer and based on the pronunciation generator processing the audio data before the automated speech recognizer has completed transcribing the audio data, a sequence of phones that reflects the user's pronunciation of a particular term of the voice query;
after obtaining the sequence of phones that reflects the user's pronunciation of the particular term of the voice query from the pronunciation generator, obtaining, from the automated speech recognizer, a transcription of the voice query from the audio data, wherein the transcription includes the particular term;
after (i) obtaining the sequence of phones that reflects the user's pronunciation of the particular term of the voice query from the pronunciation generator and (ii) obtaining, from the automated speech recognizer, the transcription of the voice query from the audio data, determining that a spoken acknowledgment that is to be generated for the voice query should use the user's pronunciation for the particular term;
generating, by the text-to-speech component of the voice query processing system, the spoken acknowledgment of the voice query, wherein, when output, the particular term is spoken in accordance with the user's pronunciation for the particular term based at least on the sequence of phones that was generated from the audio data by the pronunciation generator;
providing, by the text-to-speech component of the voice query processing system, the spoken acknowledgment for output; and
after providing the spoken acknowledgement for output, providing the voice query for execution by the voice action engine.

11. The system of claim 10, wherein obtaining, from the pronunciation generator that is separate from the automated speech recognizer and based on the pronunciation generator processing the audio data before the automated speech recognizer has completed transcribing the audio data, the sequence of phones that reflects the user's pronunciation of a particular term of the voice query comprises:
identifying a portion of the audio corresponding to the particular term; and
determining the sequence of phones from the portion of the audio corresponding to the particular term.

12. The system of claim 10, wherein obtaining, from the pronunciation generator that is separate from the automated speech recognizer and based on the pronunciation generator processing the audio data before the automated speech recognizer has completed transcribing the audio data, the sequence of phones that reflects the user's pronunciation of a particular term of the voice query comprises:
  mapping the sequence of phones from the audio data corresponding to the particular term to the particular term in the transcription.

13. The system of claim 10, the instructions further comprising:
  determining that the transcription includes a proper name,
  wherein providing the spoken acknowledgment of the voice query for output is in response to determining that the transcription includes a proper name.

14. The system of claim 13, wherein determining that the transcription includes a proper name comprises:
  determining that the transcription includes one or more terms that indicate that the transcription includes a proper name.

15. The system of claim 10, the instructions further comprising:
  determining, from the audio data, a confidence score for the sequence of phones that reflects a user's pronunciation for the particular term; and
  determining that the confidence score for the sequence of phones satisfies a confidence threshold,
  wherein providing the spoken acknowledgment of the voice query for output is in response to determining that the confidence score for the sequence of phones satisfies the confidence threshold.

16. The system of claim 10, wherein obtaining, from the automated speech recognizer, a transcription of the voice query from the audio data comprises:
  obtaining the transcription of the voice query from the audio data based at least on canonical pronunciation data associated with the particular term, where the canonical pronunciation data is stored in a pronunciation dictionary and different from the sequence of phones determined from the audio data encoding the voice query from the user.

17. A non-transitory computer-readable medium storing instructions executable by one or more computers which, upon such execution, cause the one or more computers to perform operations for generating synthesized, spoken acknowledgments of voice queries using personalized pronunciations, the operations comprising:
  receiving, by a front end component of a voice query processing system that includes (a) the front end component, (b) an automated speech recognizer that is configured to transcribe given audio inputs to terms, (c) a pronunciation generator that is separate from the automated speech recognizer and that is configured to generate sequences of phones that correspond to given audio inputs without mapping the sequences of phones to terms, (d) a text-to speech component, and (e) a voice action engine, audio data encoding a voice query from a user;
  providing, by the front end component of the voice query processing system, the audio data to both (i) the pronunciation generator that is separate from the automated speech recognizer and that is configured to generate, while the automated speech recognizer begins transcribing the audio data into terms, sequences of phones that correspond to given audio inputs without mapping the sequences of phone to terms, and (ii) the automated speech recognizer that is configured to transcribe given audio inputs to terms;
  obtaining, from the pronunciation generator that is separate from the automated speech recognizer and based on the pronunciation generator processing the audio data before the automated speech recognizer has completed transcribing the audio data, a sequence of phones that reflects the user's pronunciation of a particular term of the voice query;
  after obtaining the sequence of phones that reflects the user's pronunciation of the particular term of the voice query from the pronunciation generator, obtaining, from the automated speech recognizer, a transcription of the voice query from the audio data, wherein the transcription includes the particular term;
  after (i) obtaining the sequence of phones that reflects the user's pronunciation of the particular term of the voice query from the pronunciation generator and (ii) obtaining, from the automated speech recognizer, the transcription of the voice query from the audio data, determining that a spoken acknowledgment that is to be generated for the voice query should use the user's pronunciation for the particular term;
  generating, by the text-to-speech component of the voice query processing system, the spoken acknowledgment of the voice query, wherein, when output, the particular term is spoken in accordance with the user's pronunciation for the particular term based at least on the sequence of phones that was generated from the audio data by the pronunciation generator; providing, by the text-to-speech component of the voice query processing system, the spoken acknowledgment for output; and
  after providing the spoken acknowledgement for output, providing the voice query for execution by the voice action engine.

18. The medium of claim 17, wherein obtaining, from the pronunciation generator that is separate from the automated speech recognizer and based on the pronunciation generator processing the audio data before the automated speech recognizer has completed transcribing the audio data, the sequence of phones that reflects the user's pronunciation of a particular term of the voice query comprises:
  identifying a portion of the audio corresponding to the particular term; and
  determining the sequence of phones from the portion of the audio corresponding to the particular term.

19. The medium of claim 17, wherein obtaining, from the pronunciation generator that is separate from the automated speech recognizer and based on the pronunciation generator processing the audio data before the automated speech recognizer has completed transcribing the audio data, the sequence of phones that reflects the user's pronunciation of a particular term of the voice query comprises:
  mapping the sequence of phones from the audio data corresponding to the particular term to the particular term in the transcription.

20. The medium of claim 17, the instructions further comprising:
  determining, from the audio data, a confidence score for the sequence of phones associated with the particular term; and
  determining that the confidence score for the sequence of phones satisfies a confidence threshold,
  wherein providing the spoken acknowledgment of the voice query for output is in response to determining that the confidence score for the sequence of phones satisfies the confidence threshold.

* * * * *